United States Patent
Peck et al.

(10) Patent No.: US 6,886,137 B2
(45) Date of Patent: Apr. 26, 2005

(54) EYE GAZE CONTROL OF DYNAMIC INFORMATION PRESENTATION

(75) Inventors: Charles C. Peck, Newtown, CT (US); John D. Mackay, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 09/865,485

(22) Filed: May 29, 2001

(65) Prior Publication Data

US 2002/0180799 A1 Dec. 5, 2002

(51) Int. Cl.$^7$ .............................. G00G 5/00; G09G 5/08
(52) U.S. Cl. ...................................... 715/785; 345/158
(58) Field of Search ................................ 345/785, 784, 345/158, 973, 786, 974, 156, 157

(56) References Cited

U.S. PATENT DOCUMENTS

| | | | | |
|---|---|---|---|---|
| 5,016,282 A | | 5/1991 | Tomono et al. ................ 382/2 |
| 5,717,413 A | * | 2/1998 | Mizouchi ...................... 345/7 |
| 5,850,211 A | * | 12/1998 | Tognazzini ................. 345/158 |
| 5,867,158 A | * | 2/1999 | Murasaki et al. ........... 345/785 |
| 6,097,387 A | * | 8/2000 | Sciammarella et al. ..... 345/784 |
| 6,204,828 B1 | * | 3/2001 | Amir et al. .................... 345/7 |
| 6,215,471 B1 | * | 4/2001 | DeLuca ...................... 345/158 |
| 6,330,009 B1 | * | 12/2001 | Murasaki et al. ........... 345/784 |
| 6,351,273 B1 | * | 2/2002 | Lemelson et al. .......... 345/786 |

\* cited by examiner

Primary Examiner—John Cabeca
Assistant Examiner—Blaine Basom
(74) Attorney, Agent, or Firm—McGuireWoods LLP; Stephen C. Kaufman

(57) ABSTRACT

A hands-free system uses eye gaze information from an eye gaze tracking device to continuously control the rate and direction of scrollable information presented on a display in a natural manner. Initially, images begin scrolling on the display at an initial rate. An eye tracking device is used to determine the area on the display that the user is gazing. If the gaze remains fixed near an anchor position, this indicates that the images are scrolling at a comfortable speed for the user to read the information. However, if the gaze begins to drift towards the side of the display where information is appearing, the scroll rate is increased since this indicates that the text is scrolling too slowly. Conversely, if the user's gaze is detected to move toward the side of the screen where information is disappearing, the scroll rate is decreased since this indicates that the user is falling behind. If the user's gaze gets too close to the side of the screen where information is disappearing the scroll direction may be reversed.

11 Claims, 3 Drawing Sheets

EYE GAZE CONTROL OF DYNAMIC INFORMATION PRESENTATION

BACKGROUND OF THE INVENTION

1. Field of the Invention

The present invention generally relates to a system for scrolling a screen and, more particularly, to a system for scrolling an image on a computer display screen based on eye movements.

2. Description of the Related Art

Eye tracking systems can determine where on a computer screen the user is looking and they have been used as the primary input device of computers, replacing both the keyboard and the mouse. Thus, such systems are able to control all processes of a computer that do not require response times that are too short to be provided via eye movements and software constraints. Since these systems do not require any force or the use of any movements other than the eyes, they are appealing for use by people who are unable to use conventional devices.

While eye trackers can enable human-computer interaction using only the eyes, there are many reasons that such interaction can be difficult, frustrating, and tiresome. First, people do not normally consciously control their eye movements. Furthermore, people are not accustomed to changing their visual environment simply by looking at it. Another reason is that the accuracy of eye position information is limited to the angle of foveation, which is about 1 degree. This angle describes the portion of the visual field that falls entirely on the high resolution part of the retina, called the fovea. Since everything projected onto the fovea is high resolution, it is unnecessary to move the eye to evaluate foveated objects. Consequently, special techniques must be employed to improve the specificity of eye gaze information (such as enlarging an area that has been dwelled upon). Finally, eye gaze information is limited to cursor or screen position, which leads to very cumbersome styles of interaction.

Conversely, most input devices are able to convey both the action (e.g., left/right mouse click) and the object of the action (e.g., the graphical construct underneath the mouse cursor). To distinguish between an action and the object, eye trackers either use a secondary input, such as a sip-and-puff switch, or they distinguish between eye movement and eye dwell. Moving the eye to a particular screen location and dwelling there indicates the object and the desire to perform an action. This can produce a dialog window with buttons indicating the desired action, which can then be selected by looking at them and dwelling upon them. However, this results in an unnatural, slow, and cumbersome means of controlling the computer.

Reading text and navigating through information on computer screens can be difficult even when using conventional input devices and interaction idioms, like dragging the tab on a window scroll bar. This is made even more difficult when the user is unable to use conventional devices and must use alternatives, like eye tracking systems.

The challenge, therefore, is to make reading text and navigating through scrollable information easier and more natural. Scrollable information includes any information that is discretized into individual units and can be displayed sequentially. Examples of navigating through scrollable information include reading text, searching through thumbnail images, perusing the columns or rows of a spreadsheet, etc.

SUMMARY OF THE INVENTION

The invention uses eye gaze information from an eye gaze tracking system to continuously control the rate and direction of scrollable information presentation in a natural manner. Initially, images begin scrolling on the display at an initial rate. An eye tracking device is used to determine the area on the display that the user is looking. For example, consider the case of text scrolling on the display from bottom to top at an initial rate. If the users eyes remain fixed near the vertical middle of the display, reading left to right, this indicates that the text is scrolling at a comfortable speed for the user to read the text. Alternatively, if the user's eyes begin to drift up towards the top of the screen, this indicates that the text is scrolling too fast and the user is not keeping up. In this case, this shift in eye position is detected by the eye tracking device and the scroll rate is automatically reduced to a more comfortable rate for the user. If the users's eyes are reading too close to the top of the display, the scroll direction may actually be reversed so that the line being read is more centered in the display. Conversely, if the eye tracker detects that the user's eyes are drifting towards the bottom of the display, this indicates that the user is reading faster than the information is being presented and the scroll rate is automatically increased to a more comfortable rate.

In short, the present invention controls the rate of progression and the direction of progression through the information and it does so continuously based on the relationship between the text display and the position of the eyes. It uses a negative feedback system for natural control and it extracts the control information unobtrusively during the process of reading or information perusal. Explicit and secondary control gestures, such a, eye dwell or sip-and-puff devices are not required.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
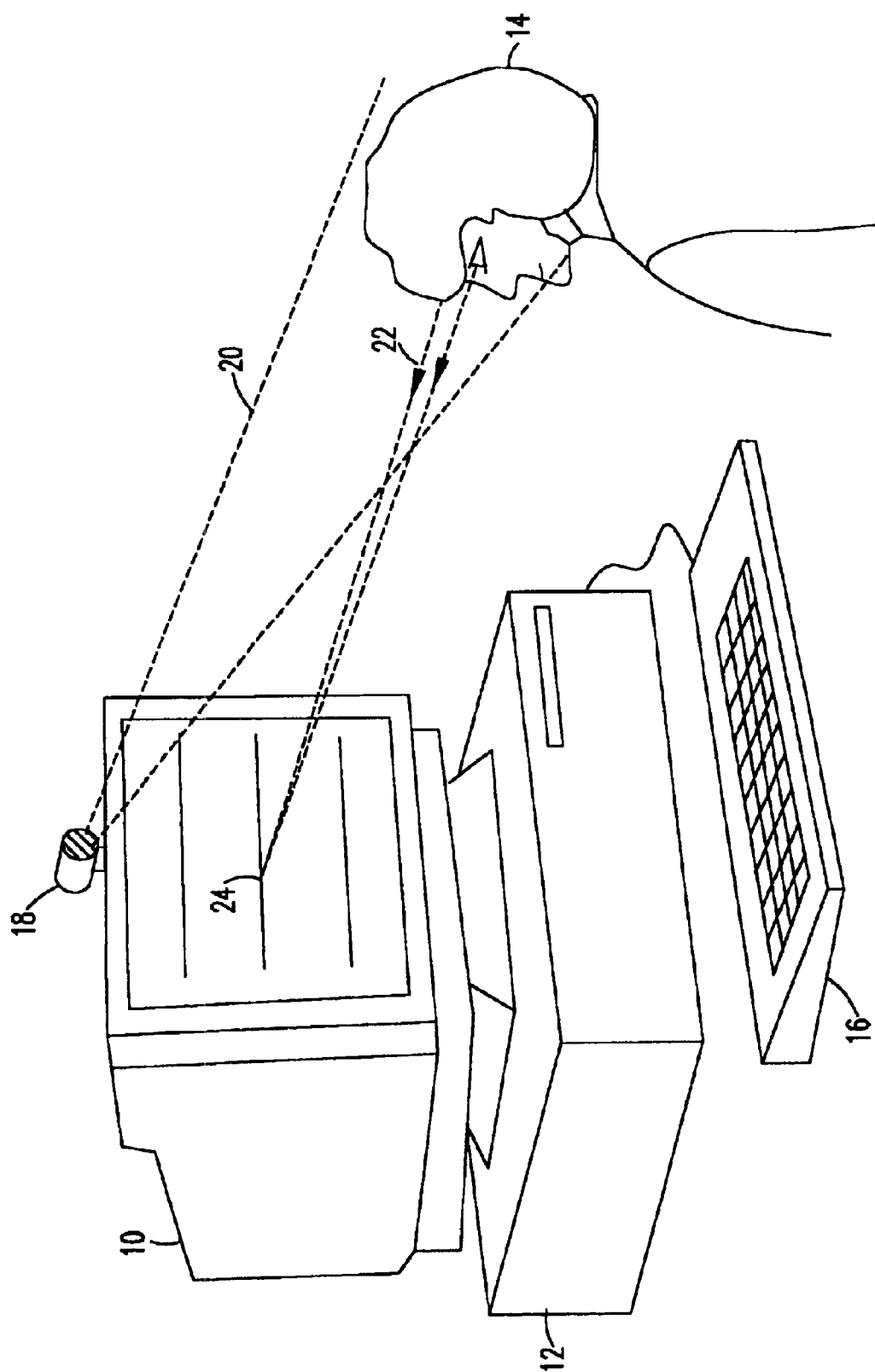
FIG. 1 is a diagram showing the basic set up of the eye gaze control system according to the present invention.

Referring now to the drawings, and more particularly to FIG. 1 there is shown a typical set up for the present invention. A display monitor 10 is connected to a computer 12 and positioned in front of a user 14. Traditional input devices such as a keyboard 16 or mouse (not shown) may also be present. However, in certain situations, the user may have physical constraints that render them unable to use traditional input devices. Therefore, the present invention provides an alternative to these traditional devices and would be useful for any individual capable of moving his or her eyes, including a quadriplegic or similarly disabled person.

In particular, an eye gaze tracker 18 is mounted and aimed such that the user's eyes 22 are in its field of vision 20. Suitable eye tracking devices or cameras are well known in the art. The purpose of eye gaze trackers, also called eye trackers, is to determine where an individual is looking. The primary use of the technology is as an input device for human-computer interaction. In such a capacity, eye trackers enable the computer to determine where on the computer screen the individual is looking. The most effective and common eye tracking technology exploits the "bright-eye" effect. The bright-eye effect is familiar to most people as the glowing red pupils observed in photographs of people taken with a flash that is mounted near the camera lens. In the case of eye trackers, the eye is illuminated with infrared light, which is not visible to the human eye. An Infrared camera can easily detect the infrared light re-emitted by the retina. It can also detect the even brighter primary reflection of the infrared illuminator off of the front surface of the eye. The relative position of the primary reflection to the large circle caused by the light re-emitted by the retina (the bright-eye effect) can be used to determine the direction of gaze. This information, combined with the relative positions of the camera 18, the eyes 22, and the computer display 10, can be used to compute where on the computer screen the user 14 is looking 24.

The invention uses eye gaze information from an eye gaze tracking system to continuously control the rate and direction of scrollable information presentation in a natural manner. The invention may be applied to text or information that scrolls in any direction, such as vertically or horizontally.

Figure 2:
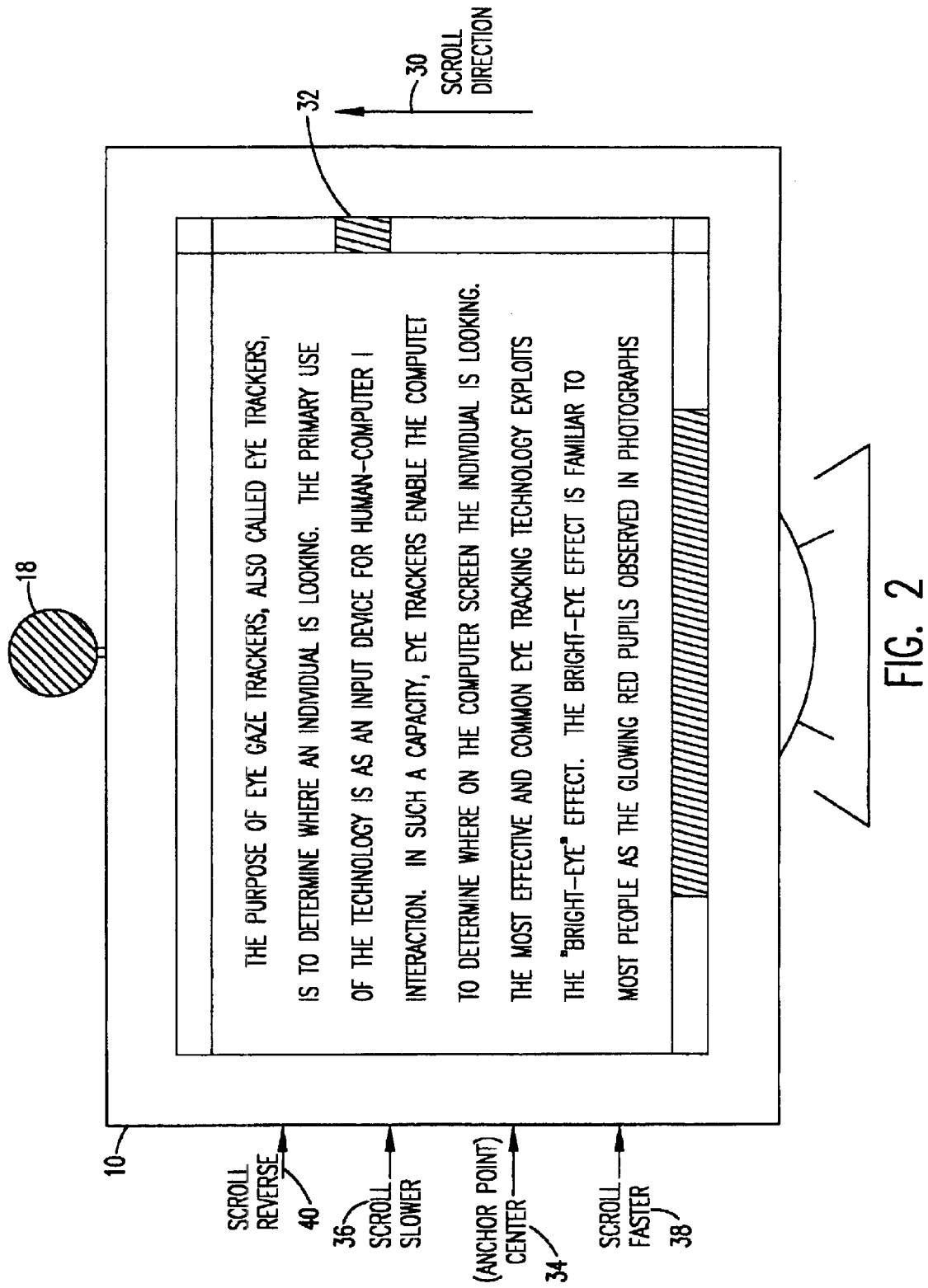
FIG. 2 is a screen illustrating automatic scroll rate.

Referring to FIG. 2, this description will assume that the scrollable information is text and that it scrolls vertically from the bottom to top of a text window as indicated by arrow 30 (the vertical scroll bar 32 moves from top to bottom). This, however, is not a requirement as the invention applies to other types of information and multiples styles of scrolling.

Groups of text appear at the bottom of the text window and appear to move up the screen at an initial rate. If the eye gaze is near the center 34 of the text window then the rate of text movement does not change. This is consistent with the reader being able to assimilate the text at exactly the same rate as it is being presented. If the text is being presented too fast, then the reader will tend to follow a group of text past the center of the text window, say to point 36. Thus, when the eye gaze moves above the center of the screen, the rate of text presentation will automatically slow down. Similarly, if the text is being presented too slowly, the reader will tend to read ahead. This corresponds to moving the eye gaze below the center of the text window, say to point 38. Thus, the invention will increase the rate of text presentation when the eye gaze moves below the center of the text window. In this manner, the rate of information presentation will automatically adjust to the rate at which it is being assimilated.

As a variation, this rate adjustment mechanism need not be anchored to the center of the window 34. The anchor location can dynamically adjust itself to the position of eye gaze dwell. Thus, the rate remains constant as long as the eye does not move up or down. If it moves down, the invention increases the rate of information presentation; if it moves up, the invention decreases the rate of information presentation. In this manner, the rate at which information is presented depends only on the vertical location of the eye gaze. When the eye gaze is at the top of the window the rate of information presentation is low and the rate is very high near the bottom of the window.

As the eye gaze approaches the top of the window, the rate of text presentation will decrease until the eye gaze reaches the point 40 at which the direction of information presentation reverses. At this point, the effect of eye gaze position is reversed. At the top of the window, the rate of reverse information presentation (an downward motion) is at its highest. As the eye gaze approaches the center of the window 34 the reverse rate slows until it gets high enough that the direction reverses again. At this point, the information will once again flow from the bottom to the top.

To decrease the flow rate discontinuity at the direction reversals, a transient effect can be added. This transient effect will tend to slow down the rate, but its effect will diminish with time. Thus, a reversal from upward motion to downward motion will be slow enough that the eye can adjust and follow the information. During this transient, the eye can move to the vertical position that corresponds to the rate at which information can be assimilated. Soon the transient effect dissipates and normal behavior resumes.

Figure 3:
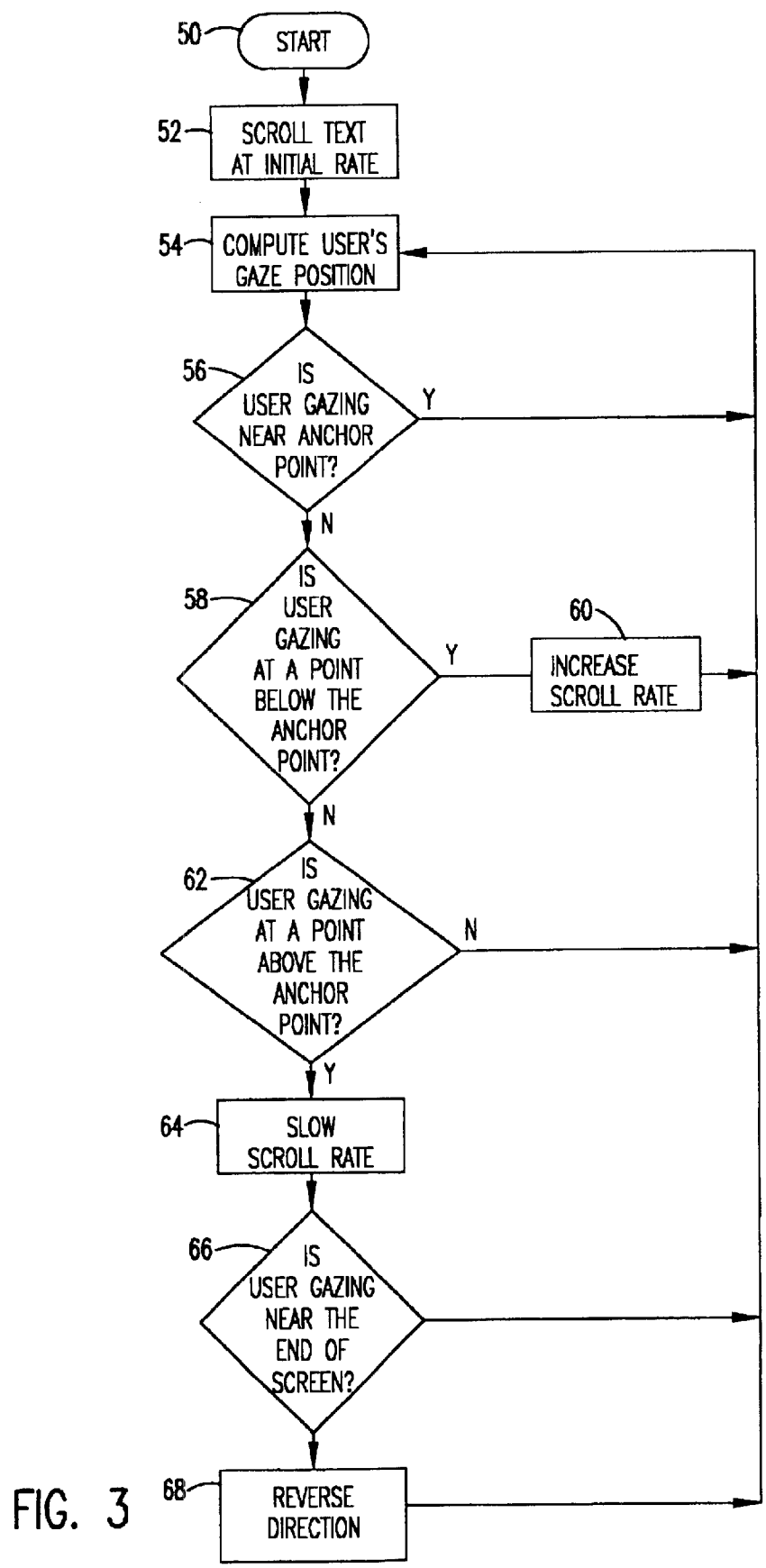
FIG. 3 is a flow diagram illustrating the steps for automatically controlling the display scroll rate according to gaze position.

FIG. 3 is a flow diagram outlining the above procedure. Once the system is started 50, text or other display objects begin to scroll at an initial scroll rates 52, perhaps one line every 5–10 seconds. In the preferred embodiment the scrolling is a smooth continuous motion. The computer 12, via the eye gaze tracker 18, computes the user's gaze position 54 and compares it to an anchor point. As shown in FIG. 2, the anchor point can be any point where the user is comfortable reading but for illustration purposes is initially set to be at the horizontal line in the at the vertical center 34 of the display. In decision block 56, if the user is determined to be gazing at the anchor point, the scroll rate remains unchanged. If, in decision block 58, it is determined that the user's gaze is drifting below the anchor point (e.g., point 38 in FIG. 2), the scroll rate is increased at block 60 since this indicates that the text is being presented too slowly and the user is reading ahead. Similarly, is at decision block 62, if it is determined that the user is gazing above the anchor point (e.g., point 36 in FIG. 2), the scroll rate is automatically decreased at block 64 since this indicates that the text is being presented faster than the reader read. If at decision block 66 it is determined that the user is gazing very near the top of the screen, the scroll direction is reversed at block 68 since in this situation it is likely that some of the text has scrolled off of the screen prior being read.

The invention has been described in terms of items scrolling from bottom to top, since this is the typical manner in scrolling items are read. However, one skilled in the art will recognize that the teachings set forth are equally as valid for text scrolling from top to bottom simply by interchanging the points at which the scroll rate is increased or decreased. Similarly, horizontal scrolling rates can also be automatically adjusted by determining the users gaze position relative to the left and right sides of the screen.

The invention may be applied to text or information that scrolls in any direction, such as vertically or horizontally. This description assumed that the scrollable information is text and that it scrolls vertically from the top to the bottom of a text window. This, however, is not a requirement as the invention applies to other types of information and multiples styles of scrolling. In addition, this invention is preferably embodied in software stored in any suitable machine readable medium such as magnetic or optical disk, network server, etc., and intended to be run of course on a computer equipped with the proper hardware including an eye gaze tracker and display.

We claim:

1. A system for using eye gaze to control a scroll rate of information presented on a display, comprising:

a display for displaying scrolling information;

means for monitoring a gaze position on said display relative to an anchor position; and control means for adjusting a speed of said scrolling information if said gaze position deviates from said anchor position and for dynamically adjusting said anchor position to the position of gaze dwell.

2. A system for using eye gaze to control the rate of information presented on a display as recited in claim 1 wherein said scrolling information scrolls from a bottom of said display to a top of said display and wherein said control means increases said scroll rate if said gaze position moves below said anchor position and decreases said scroll rate if said gaze position moves above said anchor position.

3. A system for using eye gaze to control the rate of information presented on a display as recited in claim 2 wherein said control means reverses scroll direction if said gaze position moves near said top of said display.

4. A system for using eye gaze to control the rate of information presented on a display as recited in claim 1 wherein said scrolling information scrolls from a top of said display to a bottom of said display.

5. A system for using eye gaze to control the rate of information presented on a display as recited in claim 4 wherein said control means reverses scroll direction if said gaze position moves near said bottom of said display.

6. A system for using eye gaze to control the rate of information presented on a display as presented in claim 1 wherein said anchor position is horizontal line at the center of said display.

7. A system for using eye gaze to control the rate of information presented on a display as recited in claim 1 wherein said scrolling information scrolls horizontally from a first side of said display to a second side of said display.

8. A system for using eye gaze to control the rate of information presented in a display as recited in claim 7 wherein said anchor position is a vertical line at a center of said display.

9. A system for using eye gaze to control the rate of information presented in a display as recited in claim 7 wherein said control means reverses scroll direction if said gaze position moves near said second side of said display.

10. A method for automatically adjusting a scroll rate of information scrolling on a display, comprising the steps of:

defining an initial anchor position near a center line of a display;

scrolling information across said display at a scroll rate with new information appearing at a first side of said display and disappearing at a second side of said display;

tracking a gaze position on said display, and adjusting the anchor position based on a gaze dwell;

increasing said scroll rate if said gaze position moves from said anchor position toward said first side of said display;

decreasing said scroll rate if said gaze position moves from said anchor position toward said second side of said display; and reversing a direction of the scroll information when said gaze position is along a line near said second side of said display.

11. A computer readable medium comprising software instructions for automatically adjusting a scroll rate of information scrolling on a display, said instructions comprising the steps of:

defining an initial anchor position near a center line of a display;

adjusting said anchor position in response to gaze dwell;

scrolling information across said display at a scroll rate with new information appearing at a first side of said display and disappearing at a second side of said display;

tracking a gaze position on said display;

increasing said scroll rate if said gaze position moves from said anchor position toward said first side of said display; and decreasing said scroll rate if said gaze position moves from said anchor position toward said second side of said display; and reversing a direction of the scroll information when said gaze position is along a line near said second side of said display.

* * * * *